Dec. 11, 1962 R. MARLOT 3,067,941
APPARATUS FOR MEASURING THE PRODUCT OF AT LEAST
TWO FACTORS AND IN PARTICULAR FOR COUNTING
THE CONSUMPTION OF ELECTRICAL ENERGY
Filed Oct. 4, 1957 7 Sheets-Sheet 1

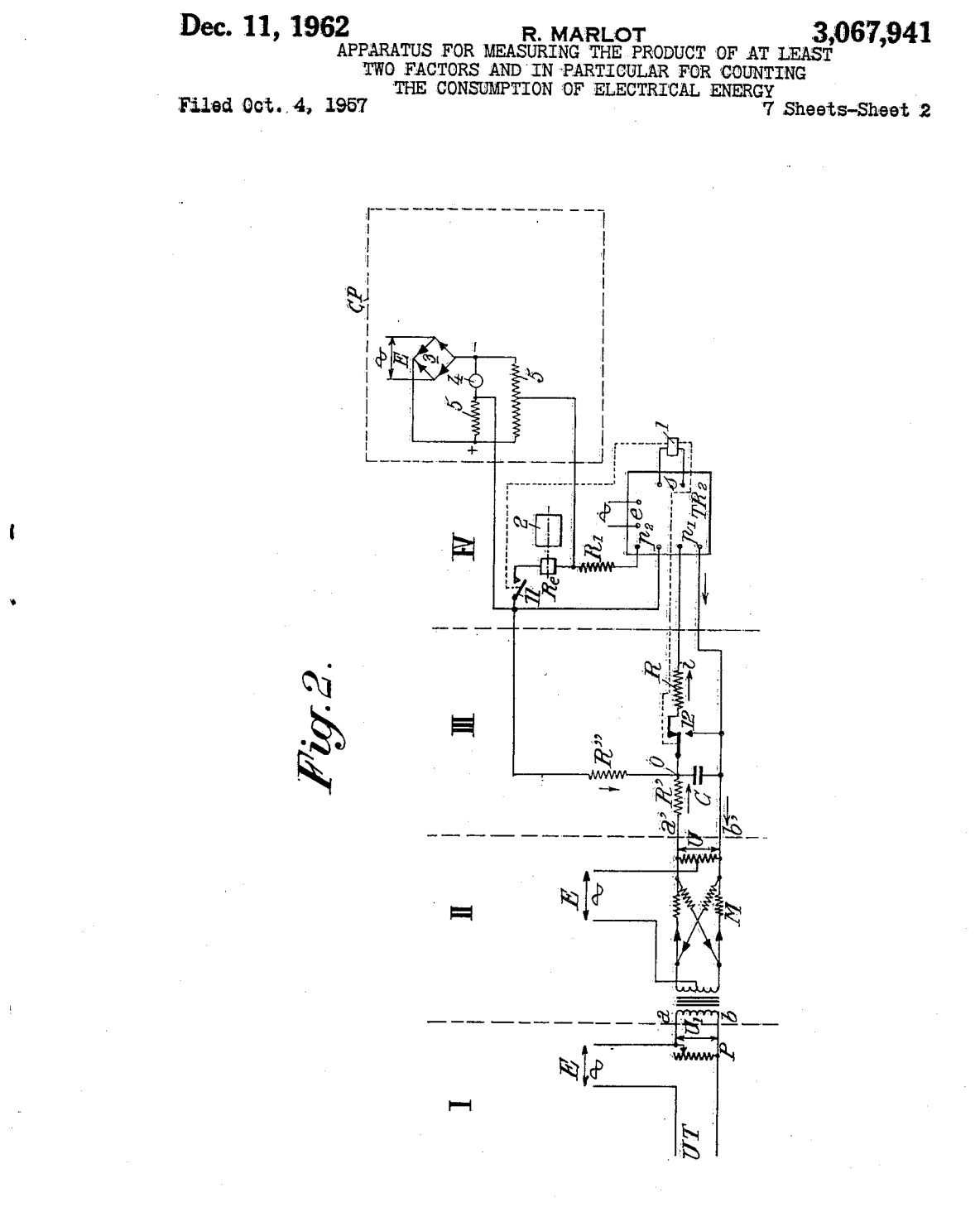

Dec. 11, 1962 R. MARLOT 3,067,941
APPARATUS FOR MEASURING THE PRODUCT OF AT LEAST
TWO FACTORS AND IN PARTICULAR FOR COUNTING
THE CONSUMPTION OF ELECTRICAL ENERGY
Filed Oct. 4, 1957 7 Sheets-Sheet 2

Fig. 2.

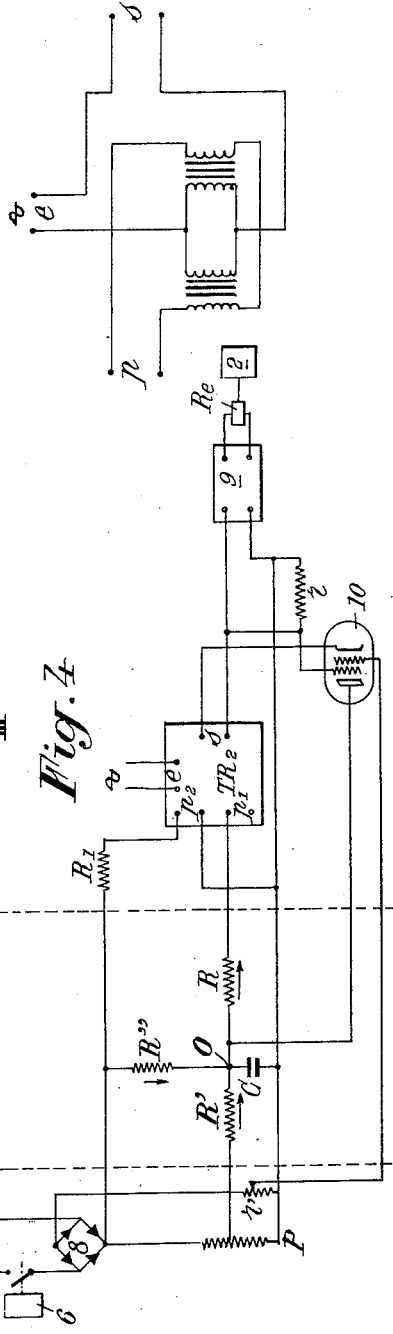

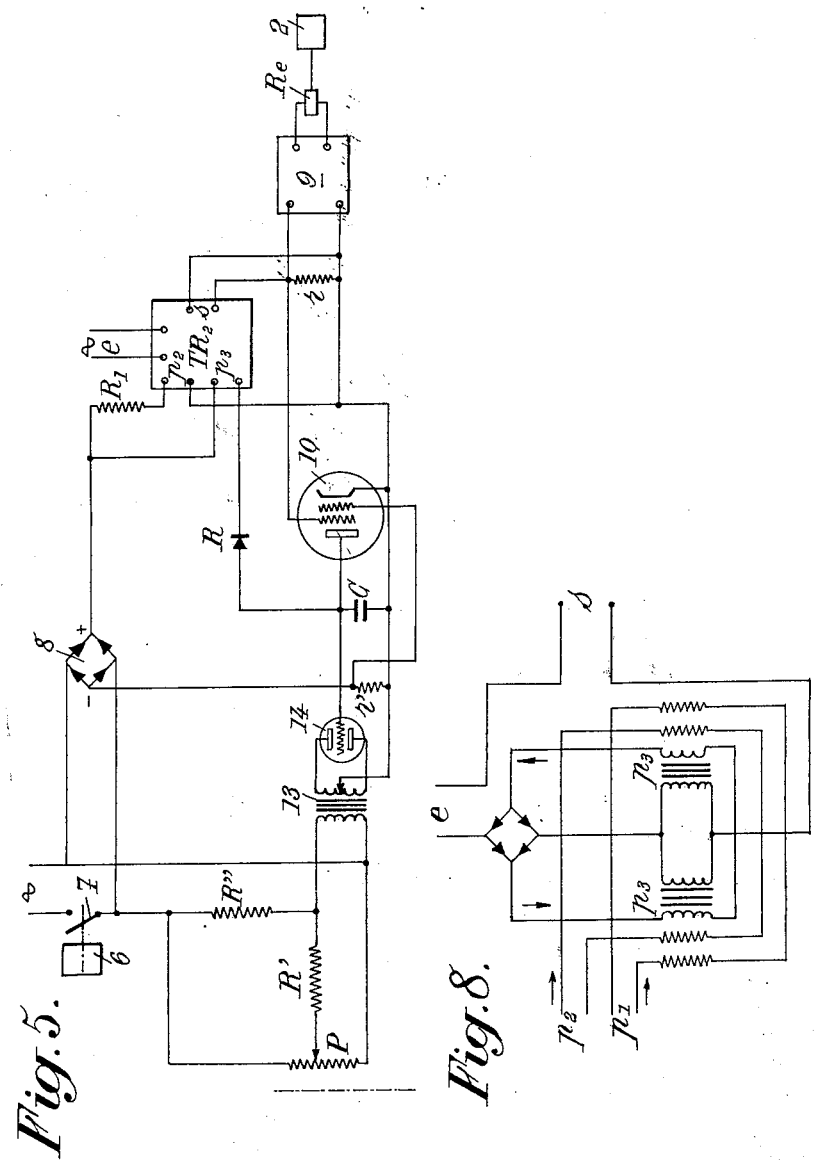

United States Patent Office 3,067,941
Patented Dec. 11, 1962

3,067,941
APPARATUS FOR MEASURING THE PRODUCT OF AT LEAST TWO FACTORS AND IN PARTICULAR FOR COUNTING THE CONSUMPTION OF ELECTRICAL ENERGY
Raoul Marlot, Saint Jean de Luz, France, assignor to Electricite de France, Service National, Paris, France, a French society
Filed Oct. 4, 1957, Ser. No. 688,159
Claims priority, application France Oct. 6, 1956
3 Claims. (Cl. 235—194)

The present invention relates to apparatus for measuring the product of two factors A and B or for measuring the value of an integral $\int A dB$, B being in particular the time $t$ or being represented in the form of a variable time. Such apparatus are intended in particular to permit of counting and charging to an account the electrical energy that has been consumed. However, such apparatus may be used for other purposes, in particular for telemeasurement and telecounting, and they may also constitute calculating machines (one of the factors introduced into such a machine being then represented, as it will be hereinafter explained, in the form of a variable time).

The chief object of my invention is to provide an apparatus of the type described which is essentially static in its nature and therefore permits of dispensing with any mechanical or rotating parts.

According to my invention, one of the factors A represented by an electric term, in particular a direct voltage, is applied to a delay or electricity storing circuit arranged in such manner as to be charged according to a substantially linear law with respect to time, and this circuit is used in combination with a comparator device of low voltage triggering level (in particular of the transducer, magnetic amplifier or transistor type) capable of producing the discharge of said circuit and a recording thereof by a suitable counter every time the charge which is in the form of $\int k A dt$ reaches a given value determined by suitable means included in the apparatus.

Preferred embodiments of the present invention will be hereinafter described with reference to the accompanying drawings, given merely by way of example and in which:

FIG. 1 is a diagrammatical view of an apparatus made according to the invention for counting the consumption of electrical energy;

FIG. 2 shows a modification of such an apparatus;

Figure 9:
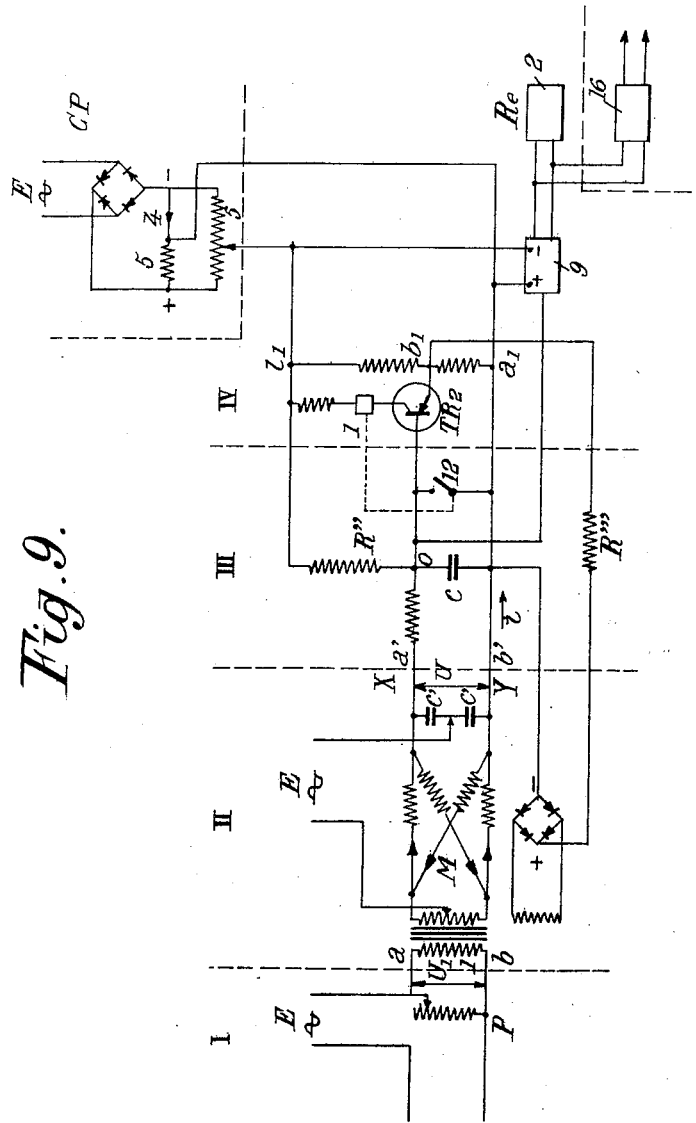
Figure 10:
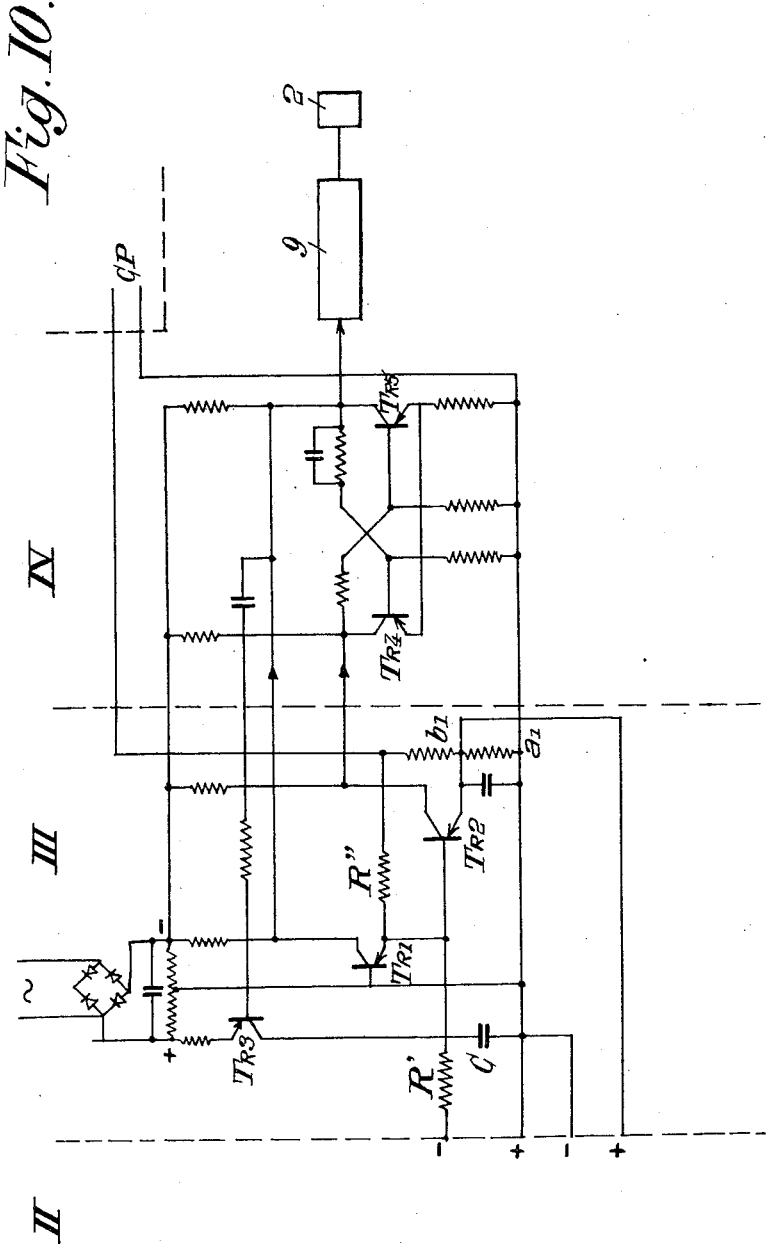
Figure 11:
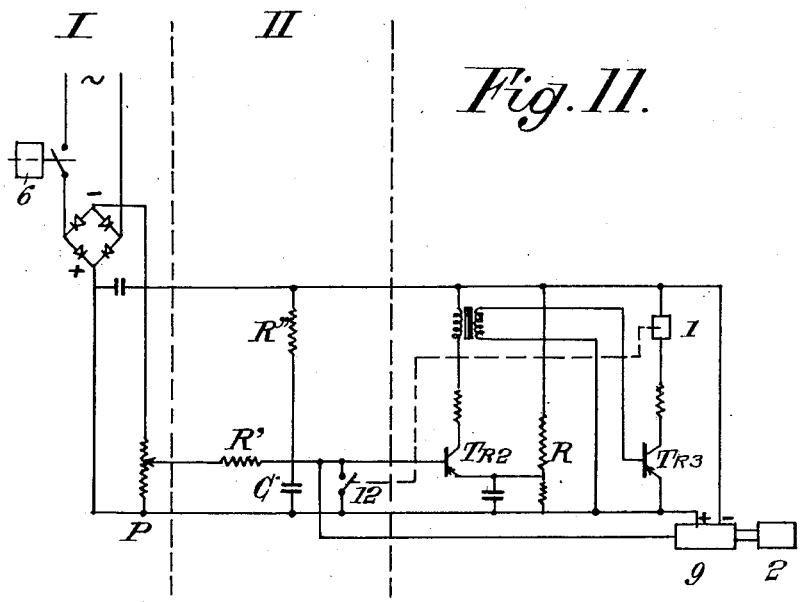
Figure 12:
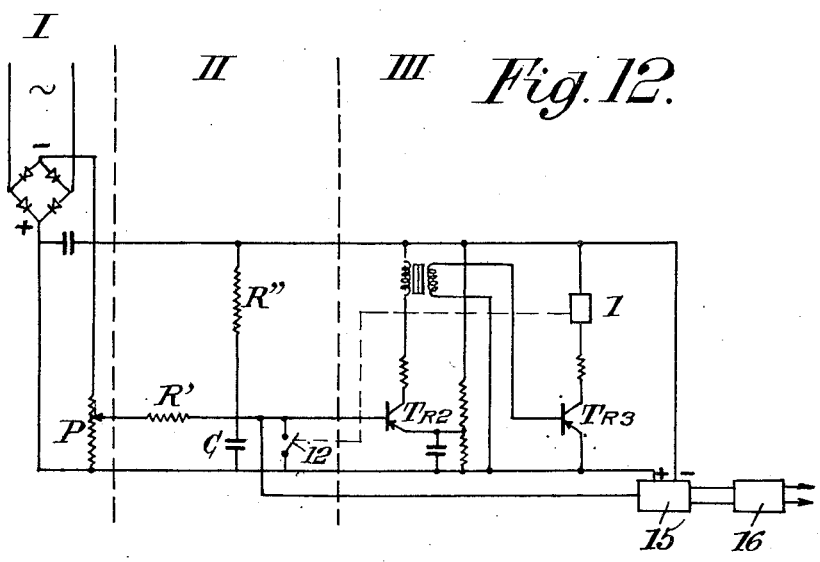

FIG. 3 similarly shows a calculating machine according to my invention;

FIGS. 4 and 5 show machines of the same kind made according to two modifications of the embodiment of FIG. 3;

FIG. 6 is a diagram illustrating the application of the invention to telemeasurement;

FIGS. 7 and 8 are lay-outs of known transducers or magnetic amplifiers to be used in apparatus according to my invention;

FIG. 9 diagrammatically shows an energy counting apparatus or telemeasurement transmitter of the kind of that of FIG. 2, made according to another feature of the invention;

FIG. 10 shows an apparatus of the same kind but made according to a modification;

FIG. 11 shows the lay-out of a calculating machine of the kind of that of FIG. 4 but made according to a modification;

FIG. 12 shows the adaptation of the invention to telemeasurement (or telecontrol or telesignalling) in the measuring and transmitting portion of a telemeter according to the feature illustrated by FIG. 9.

It should first be reminded that, up to now, the consumption of energy has been measured by means of counters giving, not the prices to be paid, but the number of kilowatt-hours, so that the sums to be paid by subscribers can be charged to their accounts only after the indications of the counter have been read in a separate operation. This involves a substantial loss of time.

Furthermore, the counters used at the present time, with the generally electromechanical system they include, that is to say counters including rotating pieces, necessitate considerable upkeep. Despite this, it is a fact that such counters gradually get lagging and record less than the energy truly consumed.

The apparatus according to the present invention are intended to overcome these drawbacks.

For this purpose, I start from an electric term, in particular an alternating voltage $U_1$ (FIG. 1) which represents the current I that is consumed in the utilization network UT fed by alternating current of voltage E, e.g. from the mains or power lines, but I provide means making it possible to vary this measurement voltage $U_1$ as a function of the tariff to be applied. Such means will include for instance what may be called a "tariff potentiometer" P which permits, by suitable adjustment, of adapting the value of $U_1$ to the tariff.

This value $U_1$ (obtained on the lay-out of FIG. 1 at $ab$) is fed to the input of the counter.

Concerning the counter proper, it is intended to integrate with respect to time the following magnitude (the above mentioned tariff coefficient being incorporated therein):

$$W = EI \cos \varphi \text{ i.e. the power}$$

where

E is the alternating voltage that is being actually used (slightly variable with respect to the mean value of the voltage $E_0$ of the mains,
I is the current that is consumed,
$\varphi$ is the power factor.

It is first desired to provide means for representing the value $$I \cos \varphi \text{ or } I \sin \varphi$$

This can be obtained in a known fashion by making use of a phase modifying system or phase-shifter M (ring modulator, dry rectifier or tube modulator, etc.) arranged in such manner:

That, at the input end, it receives on the one hand an alternating voltage proportional to I, for instance the above mentioned voltage $U_1$, and on the other hand the utilization alternating voltage E of the network, and that, at the output end, it delivers, at terminals such as $a'b'$ (FIG. 1) a direct voltage U such that:

$$U = kI \cos \varphi$$

$k$ being a coefficient.

In order to integrate this voltage U with respect to time and to indicate or to record the results of this integration, I proceed in the following manner according to my invention:

This voltage U is used to charge a delay or electricity storing circuit (including at least one capacitor combined with resistors, or including at least one inductor or coil, or again including a combination of these elements), this circuit being such that its charge characteristic is a linear function of time, that is to say that I obtain in said circuit a charge current $i$ of the form $k'Ut$ (it being supposed that U does not vary within a small time interval $t$) or $kk'It \cos \varphi$, that is to say a current $i$ which truly represents the desired integral.

This current $i$ or an amplified current obtained therefrom, is compared with a reference current $i_1$ in a suitable comparator in such manner as to record, e.g. by means of relays, one count in a suitable measurement apparatus (of the dial, recording band, perforation, or electronic type, for instance) every time $i=i_1$, which corresponds to the consumption of a given amount of energy or (account being taken of the tariff potentiometer) at a given price, this solution making it possible directly to charge the sum of money corresponding to the consumption in the apparatus.

Furthermore, every time the counter records a count, the above mentioned capacitor is discharged in such manner as to start a new cycle, and so on.

The apparatus may further include, in the application that is being considered, correcting means to take into account the variations of voltage E with respect to the mean value $E_0$ (since $W = EI \cos \varphi$), these means acting for instance in such manner as to modify the value of the reference current $i_1$.

Concerning the means to be provided to obtain a linear charge characteristic of the capacitor (which normally is exponential), said means will be arranged in such manner as to provide a negative feedback which may be either a current feedback (as hereinafter described with reference to FIG. 1), or a voltage feedback (as described with reference to FIG. 2), such a negative feedback, in combination with a suitable choice of the constants of the circuit, providing for the desired linear characteristic. Of course, this is only one embodiment of such a system.

The comparator to be used according to my invention may be an apparatus such as a transducer or a magnetic amplifier, this indication being not exclusive of the use of other comparators or differential relays of low voltage triggering level, in particular of the type including transistors.

I will now describe two embodiments of my invention. After this description it will be explained how the same lay-outs or analogous ones, may be used for all kinds of countings, that is to say whatever be the magnitudes A and B to be multiplied or integrated.

According to the embodiment of FIG. 1,

The voltage $UkI \cos \varphi$ delivered at $a'b'$ is applied to a delay or storing circuit including a capacitor C and two resistors R and R'.

The current $i$ flowing through resistor R is applied to an amplifier which delivers at its output an amplified current $ni$ which is reintroduced at the input, for instance at the terminals of C, to produce the desired negative feedback, said amplifier being advantageously constituted by a transducer $Tr_1$ including a primary $p$ (which receives $i$), a secondary $s$ (which delivers $ni$) and an alternating excitation winding $e$, Comparison is effected, for instance in a self-excited transducer $Tr_2$, between, on the one hand curent $i$ or $ni$ and on the other hand the reference current $i_1$ which is supplied by a compensating system CP to which the voltage E of the network is fed and which is further connected to a stabilizing voltage source $E_0$, currents $ni$ and $i_1$ being respectively fed to the two primaries $p_1$ and $p_2$ of transducer $Tr_2$, whereas the secondary of said transducer is connected with a relay 1, the alternating excitation being shown at $e$, Finally, said relay 1 is made to control on the one hand a first set of contacts 11 which ensures, through a counting relay Re, the counting operation in a suitable counting apparatus 2 (which may be relay Re itself), and on the other hand a second set of contacts 12 to cause the capacitor C to be discharged.

The compensating system CP which supplies reference current $i_1$ is for instance constituted by a rectifier 3 combined with a source 4 which delivers voltage $E_0$ and with a potentiometer 5, said current $i_1$ being in particular of the form:

$$i_1 = m(2E_0 - E)$$

where $m$ is a constant.

A supplementary resistor, which may be adjustable, may be provided at $R_1$.

FIGS. 7 and 8 show, by way of indication, the layouts of known transducers or magnetic amplifiers i.e. D.C. amplifiers of the symmetrical type. FIG. 7 relates to transducer $Tr_1$ and FIG. 8 to transducer $Tr_2$. The latter, which is supposed to include a bias supplementary primary winding $p_3$, acts as a comparator or differential relay and might be replaced by any other apparatus capable of performing this function.

Thus the apparatus shown by FIG. 1 includes four main portions:

A portion (I) for the introduction of an alternating voltage representing the consumed intensity I in network UT, with however the application of a tariff coefficient (by means of the adjustable potentiometer P), A portion (II) for the introduction of $\cos \varphi$, A portion (III) for the introduction of time, whereby there is obtained a current variable in accordance with the time that has elapsed, And a portion (IV) for comparison with a reference current (with a correction as a function of the variations of E) giving rise to the recording of a count for every unit (in money) of energy that is consumed.

The operation is as follows.

If the Kirchoff law is applied at the terminal O of FIG. 1, the following equation is obtained:

$$\frac{U-Ri}{R'} + ni = i + CR\frac{di}{dt}$$

which may be written:

$$\frac{U}{R'} = \left(1 + \frac{R}{R'} - n\right)i + CR\frac{di}{dt}$$

In such a system I may obtain, by a sitable calculation of the parameters, that:

$$n = 1 + \frac{R}{R'}$$

It then follows that:

$$it = \frac{Ut}{CRR'} = \frac{KIt \cos \varphi}{CRR'}$$

I thus obtain a charge current varying linearly with respect to U and with respect to the time, that is to say having a value proportional to $It \cos \varphi$.

If now this current $i$ or $ni$ is applied to the primary $p_1$ of transducer $Tr'$, it may be noted that:

As long as $i$ is sufficiently small, nothing takes place,

But when $i$ is sufficiently big to balance the value of the reference current $i_1$ applied to the primary $p_2$, relay 1 is excited, thus causing on the one hand the counter to record a count (through 11, Re and 2) and on the other hand the capacitor to be discharged (through 12), after which the same cycle is repeated and so on.

On the other hand it will be noted that the time $t_1$ which elapses between two operations of relay 1 is given by the following relation:

$$\frac{kIt_1 \cos \varphi}{CRR'} = m(2E_0 - E)$$

which may be written:

$$EIt_1 \cos \varphi = \frac{mCRR'}{k}E(2E_0 - E)$$

or $$EIt_1 \cos \varphi = \frac{mCRR''}{k}E_0^2\left[1 - \left(\frac{E-E_0}{E}\right)^2\right]$$

Now the term between brackets varies only by 1% when E differs from its normal value by 10% or more. It is therefore possible to write:

$$EIt_1 \cos \varphi = \frac{mCRR'}{k}E_0^2 = \text{constant}$$

The amount of energy consumed between two operations of the relay is constant. It is possible to adjust the tariff potentiometer in such manner that this amount corresponds for instance to a price to be paid equal to a monetary unit. In this case, relay $Re$ or apparatus 2 will indicate in said monetary units the sum to be paid by the subscriber.

The apparatus is capable of measuring reactive energy. It may also measure apparent energy by substituting a rectifier or the like for the phase shifter M.

The apparatus may give the sum of countings for several phases of the current. Only the portion of the lay-out located on the left hand side of line XY is different according to the current phase.

According to the modification of FIG. 2, I make use, in order to obtain a linear characteristic of charge, of a voltage negative feedback.

For instance I apply current $i$ directly to the primary $p_1$ of the transducer or differential relay $Tr_2$, the primary $p_2$ of which is fed as above stated. It is then possible to obtain at point O the same voltage as that which is fed to the primary $p_2$ and which is suitably adjusted by means of a resistor $R''$. By a suitable calculation of the different resistors, I also obtain, in this case, a linear characteristic of charge.

It will now be shown that apparatus such as above described may be used for all kinds of countings, that is to say to perform multiplications or other operations concerning all kinds of factors or variable quantities.

As a matter of fact, if two factors A and B of any kind whatever are to be multiplied by each other, such factors being in this case supposed to be constant, one of them A will be introduced as above in the form of a voltage (at $ab$ FIG. 3), whereas the other one B will be transformed into a time $t$ of a given duration. The apparatus will then be operated during a time equal to $t$. At the end of this time, the result of the operation will be registered on a counter by means of comparator $Tr_2$ and its relay $Re$, this result being AB or $At$.

The time $t$ will be for instance given by a device 6 for counting seconds or the like (FIGS. 3 and 4) capable of opening, and then closing, respectively at the beginning and at the end of a period of time equal to $t$, a switch 7 which controls the succession of operations.

FIGS. 3 and 4 show two embodiments, respectively with a current negative feedback and a voltage negative feedback, for producing operations of this kind, for instance a multiplication of a number by another one. FIGS. 3 and 4 further illustrate other features which might be applied also in the case of FIGS. 1 and 2.

FIG. 3 shows a calculating machine of this kind including a source, for instance an alternating current source 3, applied to a rectifier 8 which feeds current to potentiometer P and also supplies transducer $Tr_2$ with the comparison current $i_1$.

One of the two numbers to be multiplied by each other, for instance the smaller one, is inscribed on potentiometer P. The other one is inscribed on the apparatus 6 for counting seconds. This apparatus, as soon as it is released, starts the apparatus working (by means of switch 7) and stops it at the end of a time period $t$ corresponding to the second number. It is therefore possible to read (or to record) on the reading apparatus 2, controlled from relay $Re$, the number which corresponds to the desired product.

The operation is the same in the construction of FIG. 4 where it has been supposed that point O receives a voltage negative feedback (as in the case of FIG. 2).

For the sake of clarity, I have shown on said FIGS. 3 and 4 three portions, to wit:

A portion (I) corresponding to the entering of factors A and B, A being represented by a voltage deduced from potentiometer P and B being represented by a variable time, A portion (II) corresponding to multiplication by time $t$, the voltage received at $ab$, at the input, being transformed at $a'b'$ into a current $i$ which varies linearly with respect to time $t$ during a number of cycles including each the charging of the delay circuit and its discharge, And the portion (III) where comparison and operation of the counter take place, said counter 2 recording a number equal or proportional to the number of said cycles.

Such machines also permit of performing in a simple manner operations other than multiplication.

For adding two numbers together, in particular, for instance numbers of hundreds, I place for instance the potentiometer on position 100. Then I mark the first number on the apparatus 6 capable of counting seconds. I then return to zero said apparatus, but not the integrator or counter 2 and the charge stored in capacitor C. The second number is then marked. The integrator will indicate the sum with two zeros after the significant figure.

For every operation, the accuracy of the apparatus will be indicated by the last number that is recorded. This accuracy may be adjusted for instance by means of a resistor such as $R_1$ acting upon the reference term $i_1$. It should be considered that, due to the low voltage triggering level of the magnetic amplifier $TR_2$ performing the comparison between $i$ and $i_1$, each counting can take place after the storing of a small electrical charge in capacitor C, thereby allowing a high accuracy to be obtained, and low voltage sources 3 may be used.

Calculating machines of this kind might advantageously be used for charging the accounts with the prices corresponding to the result of the operations. For instance, when applied to the counting of electrical energy consumption and if the old counters marking their indications in kilowatt-hours are still used, a man making use of a calculating machine such as above described can immediately determine the sums to be paid.

Advantageously, according to another feature of the invention which is illustrated by FIGS. 3 to 5, I may replace the relay 1 shown on FIGS. 1 and 2 by a flip-flop circuit 9 (of the type including vacuum tubes, or semiconductors, or transistors, etc.) and a thyratron 10 or transistor. The flip-flop circuit 9 replaces the contact 11 of FIG. 1 and the thyratron 10 replaces contact 12.

The system constituted by these two devices, to wit the flip-flop circuit and the thyratron, thus performs, as was the case for contacts 11, 12 and relay 1 in FIG. 1, the double function of operating the counter 2 and discharging the capacitor C. The two control grids of the thyratron are adjustably biased by resistors $r$ and $r'$.

Such an arrangement is particularly useful in cases where the relay 1 of FIG. 1 would not be capable of working sufficiently fast. Counting from the flip-flop circuit may be made in the binary system.

The relay $Re$ of FIG. 1, which may be of the kind used for counting telephonic communications, might also be replaced by a decimal counter-tube of a known type.

FIG. 5 illustrates another feature according to which I interpose, between resistor $R'$ and capacitor C, a transformer 13 and a rectifier 14, which is interesting to increase the time constant of the system.

Said FIGURE 5 further shows that resistor R may be arranged in the form of a rectifier (or a diode).

It may also be noted that another application of the invention consists in a telemeter system for telemeasurement or telecounting.

As a matter of fact, the impulses of the transducers may be transmitted to a distance and act at a receiver station on a counting device analogous to that existing at the transmitting station; this permits telecounting.

On the other hand, and this in particular for teletransmissions or telemeasurements, it must be noted that, in accordance with what has been stated above, the time $t_0$ between two pulses delivered by transducer $Tr_2$ is inversely proportional to the power P in the utilization circuit, that is to say:

$$Pt_0 = \text{constant}$$

If therefore time $t_0$ is measured, this is equivalent to measuring power P and the apparatus becomes a wattmeter. Likewise, and more generally, when there is applied, at the input of the apparatus, a voltage proportional to any quantity Q, it is possible to transmit and to measure this quantity Q, at the receiving station, by determining the time $t_0$ between two successive pulses.

In other words, it is thus possible to transmit to a distance a value such as P or Q by sending pulses and measuring, at the receiving station, the interval $t_0$ between said pulses.

FIG. 6 illustrates this possibility.

A flip-flop 15 corresponding to flip-flop 9 of FIGS. 3 and 4 and controlled by transducer $Tr_2$, independently of its local counting function, shops successive wave trains from an oscillation of any frequency transmitted at 16 from oscillator 10. These wave trains are sent through a transmission line, either directly or by means of carrier currents, or by radio transmission to a receiving station (not known).

At the receiving station a known apparatus (binary counter, decimal counter, rotary switch, etc.) counts:

Either the number $n_1$ of oscillations contained in a wave train, this number $n_1$ being proportional to $t_0$ and therefore inversely proportional to P (or to Q), Or the number $n_2$ of wave trains transmitted during a given time period (recurrence period), this number $n_2$ being proportional to P (or to Q).

It is possible to transmit through the same channel an important number of telemeasurement terms, either simultaneously at different frequencies, or successively (cyclical telemeasurement).

The invention also extends to another feature according to which the comparator system of low voltage triggering level, instead of being constituted by transducers or magnetic amplifiers as above described, is constituted by transistors.

FIG. 9 shows, by way of example, an apparatus of the same kind as that of FIG. 2 but making use of transistors, that is to say in which the comparator device which serves to compare the counting current $i$ with the auxiliary current $i_1$ is constituted by a transistor or a group of transistors.

Such a transistor is shown at $TR_2$. The two primary circuits of the comparator become in this case the base circuit and the emitter circuit of the transistor. The secondary circuit becomes the collector circuit of the transistor and contains, as in the above described construction, relay 1 which acts upon contact 12.

When the voltage across the terminals of capacitor C is lower than the voltage V between points $a_1$ and $b_1$, only a very low current passes through the collector circuit of the transistor. When the voltage across the terminals of capacitor C is higher than the voltage V, a high current passes through the collector circuit of the transistor. Relay 1 is energized and causes the capacitor to be discharge through contact 12.

A voltage negative feedback identical to that of FIG. 2 is constituted by a resistor $R''$. It renders the charge characteristic of capacitor C linear by eliminating the exponental distortion.

The apparatus shown by FIG. 9 includes another means for producing a negative feedback constituted by a resistor $R'''$ which introduces, across terminals $a_1$, $b_1$, an electro-motive force proportional to U, in order to compensate for the dead time existing at the end of every operation of the relay (delay of the transistor, excitation of the relay, discharge of the capacitor, etc.).

A similar result would be obtained by duplicating the transistor $TR_2$, as hereinafter explained with reference to FIG. 10.

The contact 11 of relay 1, which existed in the construction of FIG. 2, has been replaced in FIG. 9 by a flip-flop of a known type. This-flop 9, according as the case may be, actuates the counting relay 2 or forms wave trains in an oscillator 16 to send them through a transmission line for telemeasurement or telecounting purposes (as already indicated with reference to FIG. 6).

Transistors may be used in many other ways.

For instance, as illustrated by FIG. 10, relay 1 may be replaced by such transistors, for instance $TR_1$, $TR_3$, $TR_4$, $TR_5$. The two last mentioned ones are mounted as flip-flops.

During the charging of the capacitor C, only transistor $TR_5$ is conducting. When the voltage across the terminals of capacitor C exceeds the reference voltage, $TR_2$ becomes conducting and switches the flip-flop from $TR_5$ to $TR_4$. Transistor $TR_3$ becomes conducting and causes the capacitor to be discharged.

When the voltage across the terminals of the capacitor is reversed, transistor $TR_1$ becomes conducting and causes the flip-flop to pass from $TR_4$ to $TR_5$. Transistor $TR_3$ ceases to be conducting and the capacitor is once more charged.

FIG. 11, which corresponds to FIG. 4, shows the application of my invention to a calculating machine.

The operation is the same as that above indicated. By way of example and in order to reduce the dead time, transistor $TR_2$ has been doubled by a transistor $TR_3$. I might for the same purpose make use of a negative feedback analogous to that above indicated (by duplicating potentiometer P).

On FIG. 12, finally, I have shown the adaptation of the preceding apparatus to a non electrical telemeasurement (concerning for instance a gas pressure or the level of water). Potentiometer P has the runner thereof mechanically coupled with the measurement apparatus. It will be noted that such a telemeasurement is independent of the feed voltage.

Besides it should be well understood that the layout of FIG. 12 (or any other suitable one) might be used for telecontrolling or telesignalling.

If for instance the runner of potentiometer P, mechanically coupled with the apparatus for measuring the gaseous pressure, the level of water or the like, is connected with contact stud referenced 25, the whole of the system transmits, through flip-flop 15 acting upon oscillator 16, 25 pulses toward the receiving station. These pulses will cause a telephonic selector of any suitable kind to move forward a distance corresponding to 25 divisions. It is thus possible to transmit from a distance any signal or to control any given element from a distance.

My apparatus has many advantages and in particular the following ones:

Absence of any moving elements (purely static operation) except relays in some embodiments,
High accuracy,
Reduction of the upkeep costs,
Practical elimination of wear and tear since the relays that are used (in particular when relays Re are of the type of those used, in automatic telephonic systems, for counting communications) being very strong and practically free from wear and tear,
Great reduction of weight (whereby portable calculating machines can easily be manufactured),
Possibility of reducing expenses and improving accuracy,
Possibility of directly charging the sum to be paid.

It should be noted that passing from one tariff to another one, in case of special tariffs, may easily be obtained automatically.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. Device for measuring the consumption of electrical power in an A.C. utilization network in which it is connected comprising in combination: means operatively connected to said network for determining an unidirectional current substantially proportional to the product of the effective current in said network by the power factor in said network; an electricity storing circuit comprising a first resistor and a capacitor; means for applying to said circuit said unidirectional current so that said capacitor is progressively charged through said first resistor by said unidirectional current; means, comprising a second resistor connected to said capacitor and said first resistor and fed by a reference voltage substantially proportional to the effective voltage in said network, for ensuring a substantially linear charge in course of time of said capacitor by said unidirectional current; an electric comparator of low voltage triggering level having two inputs for two electrical factors to be compared and one output; a pulse counter connected to said output, said comparator being adapted to deliver on said output a pulse capable of causing said counter to record one count every time the magnitudes of the two electric factors fed in the respective inputs of said comparator become equal to each other; means for feeding to one of said inputs a reference electric factor substantially proportional to the effective voltage in said network; means inserted between the output of said circuit and the other of said comparator inputs for feeding to said last mentioned input an electric factor of same nature as said reference factor and substantially proportional to the actual charge of said capacitor; and means, made operative by each pulse delivered by said comparator on the output thereof, for discharging said capacitor in said circuit.

2. Device for determining directly the price of the consumption of electrical power in an A.C. utilization network in which it is connected, according to claim 1, further comprising means for making said unidirectional current also proportional to the unit price of the electrical power.

3. Device for measuring the consumption of electrical power in an A.C. utilization network in which it is connected comprising in combination: means operatively connected to said network for determining an unidirectional current substantially proportional to the product of the effective current in said network by the power factor in said network; an electricity storing circuit comprising a first resistor and a capacitor; means for applying to said circuit said unidirectional current so that said capacitor is progressively charged through said first resistor by said unidirectional current; means, comprising a second resistor connected to said capacitor and said first resistor and fed by a reference voltage substantially proportional to the effective voltage in said network, for ensuring a substantially linear charge in course of time of said capacitor by said unidirectional current; an electric comparator including a transistor with a base circuit and an emitter circuit for two electric factors to be compared and a collector circuit; an electrical counter connected to said collector circuit, said transistor being adapted to deliver at its collector circuit an electrical signal capable of causing said counter to record one count every time the magnitudes of the two electric factors fed to the respective base and emitter circuits of said transistor become equal to each other; means for feeding to one of said base and emitter circuits a reference electric factor substantially proportional to the effective voltage in said network; means inserted between the output of said electricity storing circuit and the other of said base and emitter circuits for feeding to said last mentioned circuit an electric factor of the same nature as said reference factor and proportional to the actual charge of said capacitor; and means, made operative by each pulse delivered by said comparator on the output thereof, for discharging said capacitor in said circuit.

References Cited in the file of this patent
UNITED STATES PATENTS

| | | |
|---|---|---|
| 1,920,788 | Hausrath | Aug. 1, 1933 |
| 2,185,363 | White | Jan. 2, 1940 |
| 2,418,521 | Morton | Apr. 8, 1947 |
| 2,420,374 | Houghton | May 13, 1947 |
| 2,432,141 | Dehmel | Dec. 9, 1947 |
| 2,469,031 | Canfora | May 3, 1949 |
| 2,549,473 | Jacob | Apr. 17, 1951 |
| 2,648,832 | Johnson | Aug. 11, 1953 |
| 2,790,399 | Gloess | Apr. 30, 1957 |
| 2,816,279 | Hawes | Dec. 10, 1957 |
| 2,848,161 | Woll | Aug. 19, 1958 |
| 2,880,935 | Johnson | Apr. 7, 1959 |
| 2,891,725 | Blumenthal et al. | June 23, 1959 |
| 2,950,052 | Knox | Aug. 23, 1960 |
| 2,969,183 | Voelcker | Jan. 21, 1961 |
| 2,979,695 | Tyrlick et al. | Apr. 11, 1961 |

UNITED STATES PATENT OFFICE

CERTIFICATE OF CORRECTION

Patent No. 3,067,941  December 11, 1962

Raoul Marlot

It is hereby certified that error appears in the above numbered patent requiring correction and that the said Letters Patent should read as corrected below.

In the heading to the printed specification, line 10, for "Oct. 6, 1956" read -- Oct. 10, 1956 --.

Signed and sealed this 16th day of July 1963.

(SEAL)
Attest:

ERNEST W. SWIDER
Attesting Officer

DAVID L. LADD
Commissioner of Patents